United States Patent

Kitahara et al.

[11] Patent Number: 6,072,625
[45] Date of Patent: *Jun. 6, 2000

[54] OPTICAL MICROSCOPE APPARATUS

[75] Inventors: Akihiro Kitahara, Hino; Nobuhiro Kita, Hachioji, both of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/014,718

[22] Filed: Jan. 28, 1998

[30] Foreign Application Priority Data

Feb. 3, 1997 [JP] Japan ................... 9-020425
Feb. 24, 1997 [JP] Japan ................... 9-039104
Mar. 19, 1997 [JP] Japan ................... 9-066594

[51] Int. Cl.$^7$ ........................... G02B 21/06; G02B 21/00
[52] U.S. Cl. ..................... 359/388; 359/368; 359/384; 250/236
[58] Field of Search .................. 359/368–371, 359/385–389, 483, 489, 494–501, 831–837; 356/364–369; 250/234–236

[56] References Cited

U.S. PATENT DOCUMENTS

| | | | |
|---|---|---|---|
| 4,266,876 | 5/1981 | Nakazawa et al. | 250/236 |
| 4,350,988 | 9/1982 | Masegi | 250/236 |
| 4,948,228 | 8/1990 | Keens | 359/834 |
| 5,078,482 | 1/1992 | Feldman et al. | 359/496 |
| 5,223,956 | 6/1993 | Kramer et al. | 359/495 |
| 5,390,044 | 2/1995 | Ito et al. | 250/236 |
| 5,689,368 | 11/1997 | Okazaki | 359/496 |
| 5,691,839 | 11/1997 | Kobayashi | 359/368 |

FOREIGN PATENT DOCUMENTS

| | | |
|---|---|---|
| 6-289305 | 10/1984 | Japan . |
| 61-189789 | 9/1986 | Japan . |
| 61-219919 | 9/1986 | Japan . |
| 3-46610 | 2/1991 | Japan ................... 359/384 |
| 4-278555 | 10/1992 | Japan . |
| 5-333720 | 12/1993 | Japan . |

*Primary Examiner*—Thong Nguyen
*Attorney, Agent, or Firm*—Frishauf, Holtz, Goodman, Langer & Chick, P.C.

[57] ABSTRACT

An optical microscope apparatus includes an illumination optical system for illuminating an observation target object; an observation optical system for introducing an observation image of the observation target object; and an image rotation device provided on a light path common to the illumination optical system and the observation optical system, for rotating the observation image. The image rotation device is arranged so as to reflect a light beam entering thereinto, for odd-numbered times and to thereafter emit the light bean therefrom, and is driven to be rotated around an entering/exiting optical axis, thereby to rotate the observation image. The optical microscope apparatus further includes a scanning optical system provided in the illumination optical system, for deflecting observation light to be irradiated on the observation target object, within a predetermined angle range, so as to enter into the image rotation device, so that the sample is scanned with the observation light; and a control device for controlling a deflection angle of the scanning optical system, based on a rotation amount of the image rotation device, such that a scanning range of the observation light is adjusted to a substantially equal position, with respect to the observation target object, regardless of rotation operation of the image rotation device.

8 Claims, 7 Drawing Sheets

OPTICAL MICROSCOPE APPARATUS

BACKGROUND OF THE INVENTION

As is known, in an optical microscope of a confocal scanning type, spot illumination from a spot light source is irradiated on a sample, with the spot illumination operated so as to scan X- and Y-directions, and light transmitted through the sample or light reflected from the sample is converged onto a pin hole. The intensity of light transmitted through the pin hole is detected by a photo detector, thereby to perform a measurement of information concerning the surface of the sample.

In some cases, this kind of confocal scanning type optical microscope is used in combination with an image rotation device, in order that the scanning direction of spot illumination can be oriented in an arbitrary direction relative to a sample with the sample kept fixed. The image rotation device has an image rotation prism for rotating an optical image at an arbitrary angle in a plane vertical to the optical axis.

The image rotation prism is arranged such that a light beam entering thereinto is reflected in the prism for odd-numbered times and is thereafter emitted to the outside. Therefore, an image obtained by an emitted light beam is inverted upside down but is not changed laterally. By rotating the image rotation prism by an angle of $\theta$ around the optical axis of the entering light as the center, an optical image obtained by emitted light can be rotated by an angle of $2\theta$ around the optical axis.

Also, in the confocal scanning type optical microscope, there is a case that a user wants to zoom in an arbitrary portion of a sample, to observe the sample. It has been conventionally considered that a structure which zooms in (or magnifies) and positions an arbitrary portion of a sample with ease and with high accuracy adopts a pair of galvanic mirrors capable of performing X-scanning and Y-scanning. Specifically, an arbitrary portion of a sample can be magnified by zooming-in in a manner in which the center angles of swings of the galvanic mirrors are changed by a predetermined angle and the scanning range in the X- and Y-directions are offset to change the scanning width.

In the confocal scanning type optical microscope, the following problems should be solved.

Firstly, in a conventional structure, the polarization characteristic concerning light entering into an image rotation prism and light exiting from the prism changes in accordance with rotation of an image rotation prism. Therefore, a confocal scanning type optical microscope of a reflection type results in a problem that the brightness of an image observed is greatly changed due to the change of the polarization characteristic.

For example, in case of the structure as described above, only the prism is rotated while the polarization characteristic of the entering light is fixed. This means that the polarization characteristic of the exiting light is relatively rotated. In this case, if the polarization characteristic of exiting light from the prism changes, the amount of light reflected by a deflection splitter accordingly changes, so that the brightness of an image observed greatly changes, in a scanning type optical microscope of a reflection type in which light reflected from a sample is separated from entering light to efficiently introduce light reflected from the sample to a detector, by using a linearly polarized laser is used as a light source and by combining a deflection beam splitter and a $\lambda/4$ plate with each other.

Secondly, the following problem occurs when an image is magnified with use of galvanic mirrors described above while rotating the image by a prism. Specifically, in the above structure, the scanning range is offset and the scanning width is changed, by controlling the scanning angles of the galvanic mirrors for scanning the X- and Y-directions. Zooming of an arbitrary portion of a sample is thus performed. However, if the prism is rotated by 90° in this condition, there occurs a problem that the scanning range is shifted to a quite different range since the center of rotation and the center of the scanning range are offset.

Thirdly, where image rotation is performed with use of a prism, the axes of entering light and exiting light may be different from each other depending on the processing accuracy of respective surfaces of the prism, so that so-called whirling of light may occur.

More specifically, in case of using an image rotation device, an optical axis of the prism may be inclined to a reference plane (or a reflection surface) of the prism, depending on the processing accuracy of respective surfaces of an image rotation prism forming part of the image rotation device, or a wedge error in a prism surface may cause a difference between the optical axis of entering light and the optical axis of exiting light (i.e., the prism itself has no optical axis).

In addition, any of three axes of the rotation axis of a rotation mechanism, the optical axis of entering light, and the optical axis of the prism may be different from the other or others, due to the processing accuracy or the assembling accuracy of components of a rotation mechanism.

If an error occurs as described above, the light emitted from the image rotation device is derived from a certain optical axis, but has an angular difference $\delta\theta$. Besides, the amount and orientation of the light change in accordance with image rotation by the image rotation device, so that so-called whirling of light may occur.

As a result, an image taken in by an image detector is not rotated around the center of an optical axis, thereby causing a factor which displaces the position of an image in accordance with rotation of the image. When measuring a fine small line width as described above, there is a problem that the positional displacement causes a measurement target to be positioned out of a measure area, so that measurement is impossible. In addition, not only in measurement of a fine small line width, but also in any optical system having an image rotation device, there is a problem that some portion may falls in a peripheral portion of an image observed, due to a displacement of the center of an image.

It may be considered that the processing accuracy of respective surfaces of an image rotation prism, and the processing accuracy and assembling accuracy of a rotation mechanism should be improved much more. However, such improvements will increase the manufacturing costs and are therefore not preferable for practice.

BRIEF SUMMARY OF THE INVENTION

Therefore, the present invention has a main object of providing a confocal scanning type optical microscope apparatus including an image rotation device, which is capable of obtaining a uniform observation image with high accuracy.

More specifically, the first detailed object of the present invention is to provide a scanning type optical microscope apparatus which is capable of obtaining an observation image with uniform brightness by eliminating changes of the polarization characteristic of exiting light, even when the image rotation device is operated.

The present invention also has a second detailed object of providing a scanning type optical microscope apparatus which is capable of accurately rotating an observation image by an arbitrary angle around the center of image, regardless of a movement of a view range with respect to an observation target object.

The present invention also has a third detailed object of providing a scanning type optical microscope apparatus which is capable of achieving rotation without moving the center of an observation image, by correcting whirling of exiting light, even when the image rotation device includes errors concerning the processing accuracy or the assembling accuracy of the image rotation device.

According to a first aspect of the present invention, there is provided an optical microscope apparatus comprising: an illumination optical system for illuminating an observation target object; an observation optical system for introducing an observation image of the observation target object; and an image rotation device provided at least in the observation optical system, for rotating the observation image, wherein the image rotation device includes an image rotation optical component arranged so as to reflect an entering light beam for odd-numbered times and to thereafter emit the light beam, and is rotated around an entering/exiting optical axis, thereby to rotate the observation image, a first polarization characteristic conversion optical system provided in a light entering side of the image rotation optical component, for converting light entering into the image rotation optical component, to have a constant polarization characteristic, regardless of rotation of the image rotation optical component, and a second polarization characteristic conversion optical system provided in a light emitting side of the image rotation optical component, for converting light emitted from the image rotation optical component, to have a constant polarization characteristic, regardless of rotation of the image rotation optical component.

According to the first aspect, the polarization characteristic of the light exiting from the image rotation device can be prevented from being changed, regardless of rotation operation of the image rotation device, so that the polarization characteristic of light entering an optical system following the image rotation device can be maintained to be constant. As a result, it is always possible to obtain an observation image with uniform brightness.

According to a second aspect of the present invention, the illumination optical system and the observation optical system have a common light path, and the image rotation device is provided on the light path. The optical microscope apparatus further comprises a scanning optical system provided in the illumination optical system, for deflecting observation light to be irradiated on the observation target object, within a predetermined angle range, so as to enter into the image rotation device, so that the sample is scanned with the observation light, and a control device for controlling a deflection angle of the scanning optical system, based on a rotation amount of the image rotation device, such that a scanning range of the observation light is adjust(ed to a substantially equal position, with respect to the observation target object, regardless of rotation operation of the image rotation device.

According to the second aspect, even when the center of the scanning range is not positioned on the rotation center axis of the image, it is possible to achieve image rotation around the center of the scanning range, by controlling the deflection angle of the scanning optical system, based on the rotation amount of the image rotation device.

According to a third aspect of the present invention, the optical microscope further comprises a memory device for previously storing a whirling amount of exiting light from the image rotation device, in relation to a rotation amount of the image rotation device, an optical deflector for deflecting at least one of entering light and the exiting light of the image rotation device, by a deflection amount which can be changed, and a control device for controlling deflection to be performed by the deflector, based on the whirling amount stored in the memory device, in correspondence with a rotation amount of the image rotation device such that the whirling amount of the exiting light from the image rotation device is canceled.

According to the third aspect, it is possible to effectively canceling whirling of exiting light caused due to errors in the processing accuracy and the assembling accuracy of the image rotation device, by controlling the optical deflector in correspondence with the rotation amount of the image rotation device. As a result of this, it is possible to achieve image rotation without moving the center of an image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be explained with reference to the drawings.

First Embodiment

Figure 1:
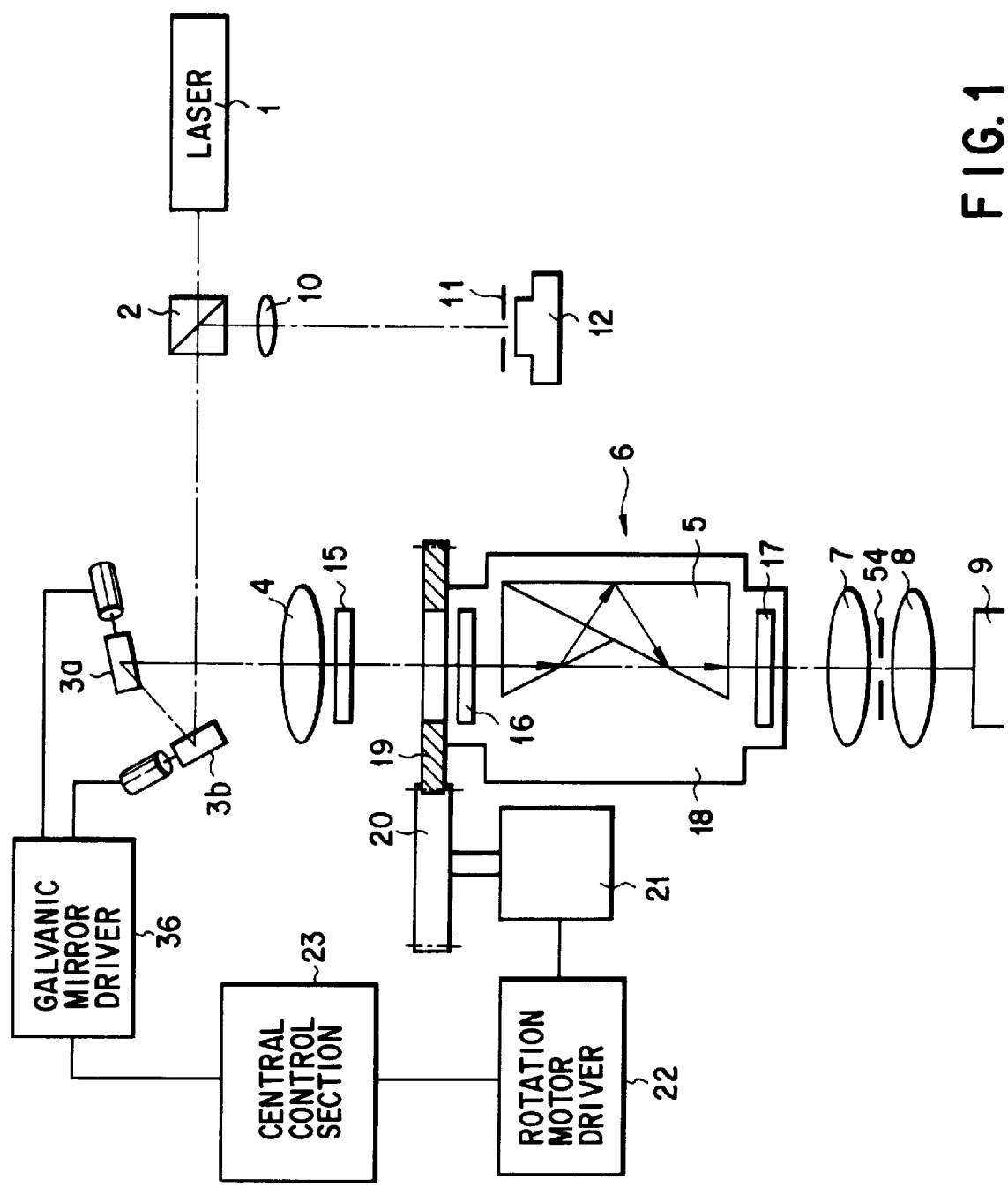
FIG. 1 is a view showing a schematic structure of a first embodiment of the present invention.

FIG. 1 shows a schematic structure of a scanning type optical microscope of a reflection type which adopts an image rotation device, according to the present invention. A basic structure of a reflection type confocal scanning optical microscope will now be explained with reference to FIG. 1, and respective features of the present invention will be explained later.

Basic Structure

In FIG. 1, a reference 1 denotes a laser light source which emits a linearly polarized laser beam. The laser beam emitted from the laser light source 1 enters into a deflection beam splitter 2. The deflection direction of the linearly polarized laser beam from the laser light source 1 is adjusted so that the laser beam passes through the deflection beam splitter 2.

A laser beam transmitted through the deflection beam splitter 2 enters into an optical deflector consisting of a pair of a horizontal scanning galvanic mirror 3a and a vertical scanning galvanic mirror 3b. This optical deflector is provided at a conjugate position with respect to the pupil of an objective lens described later. Connected with the galvanic mirrors and a driver 36, the optical deflector is arranged such that the galvanic mirrors 3a and 3b deflect the laser beam so as to scan the horizontal direction (or X-direction) and the vertical direction (or Y-direction).

A laser beam subjected to two-dimensional scanning by the galvanic mirrors 3a and 3b passes through a pupil projection lens 4 and enters into an image rotation mechanism 6 comprised of a prism 5. This entering light is reflected for odd-numbered times inside the prism 5, as indicated by a continuous line in FIG. 1, and then exits therefrom.

The exiting light is passes through an objective lens 8 and is irradiated on a sample 9. Further, light returning from the sample 9 passes through the same route as that of the entering light and reaches the deflection beam splitter 2.

The deflection beam splitter 2 reflects the returning light from the sample 9 on condition that the deflection direction is shifted by 90° from that of the entering light. The returning light is then made pass through a converging lens 10, to be converged onto a pin hole 11, and the converged light is detected by an optical detector 12, thereby to obtain a confocal image.

Structure for Maintaining Constant Polarization Characteristic of Exiting Light from Image Rotation Device Next, with reference to the same FIG. 1, explanation will be made of a first feature of the present invention, i.e., "a structure for maintaining a constant polarization characteristic of exiting Light from an image rotation device".

At first, a laser beam subjected to two-dimensional scanning by the galvanic mirrors 3a and 3b passes though a pupil projection lens 4 and enters into a first $\lambda/4$ plate 15. The optical axis of the first $\lambda/4$ plate 15 is adjusted such that linearly polarized light passing through the beam splitter 2 is changed into circularly polarized light. The laser beam thus changed into circularly polarized light by the first $\lambda/4$ plate 15 enters into the image rotation mechanism 6.

In the image rotation mechanism 6, a second $\lambda/4$ plate 16, the image rotation prism 5, and a third $\lambda/4$ plate 17 are provided on one same optical axis. The optical axis of the second $\lambda/4$ plate 16 is adjusted such that the circularly polarized light once changed by the first $\lambda/4$ plate 15 is changed again into linearly polarized light. In addition, the direction of the optical axis of the second $\lambda/4$ plate 16 and the orientation of the image rotation prism 5 are adjusted such that the linearly polarized light emitted from the second $\lambda/4$ plate 16 is deflected in a deflection direction corresponding to a direction p of total reflective surfaces of the image rotation prism 5. As a result, the image rotation prism 5 is capable of emitting linear polarized light consisting of only the p-direction component, regardless of a phase difference between the p-direction component and the s-direction component of polarized light generated by the total reflection surfaces of the image rotation prism 5. Further, the optical axis of the third $\lambda/4$ plate 17 is adjusted such that linearly polarized light emitted from the image rotation prism 5 is changed again into circularly polarized light.

In addition, the second $\lambda/4$ plate 16, the image rotation prism 5, and the third $\lambda/4$ plate 17 are provided to be integral with a prism hold member 18. The prism hold member 18 is connected to a prism rotation motor 21 through gears 19 and 20, and the motor 21 is connected to a central control section 23 through a rotation motor driver 22.

Therefore, the prism rotation motor 21 is driven on the basis of a command from the central control section 23, and the prism hold member 18 is rotated around an optical axis indicted by a one-dot chain line in FIG. 1. In this manner, the second $\lambda/4$ plate 16, the image rotation prism 5, and the third $\lambda/4$ plate 17 are integrally rotated around the optical axis.

Circularly polarized light emitted from the third $\lambda/4$ plate 17 of the image rotation mechanism enters into an objective lens 8 through an imaging lens 7, and is converged onto a sample 9. Further, reflection light from the sample 9 enters into the third $\lambda/4$ plate 17 of the image rotation mechanism through the objective lens 8 and the imaging lens 7.

In this case, in the image rotation mechanism 6, since the reflection light from the sample 9 is circularly polarized light rotated in a direction inverse to that of the entering light for illuminating the sample, the reflection light is converted by the third $\lambda/4$ plate 17, into linearly polarized light whose deflection is rotated by 90° from that of the entering light, i.e., linearly polarized light in the s-direction with respect to the image rotation prism 5. The light further enters into the image rotation prism 5. Then, like in the case of the light illuminating the sample, the image rotation prism 5 emits linearly polarized light consisting of only the s-direction component, from the linearly polarized light in the s-direction which enters into the prism 5, regardless of a phase difference between the p-direction component and the s-direction component of the deflection caused by the total reflection surfaces of the image rotation prism 5. Further, the linearly polarized light emitted from the image rotation prism 5 is changed by the second $\lambda/4$ plate 16 into circularly polarized light which is rotated in a direction inverse to that of the light illuminating the sample, and is further changed by the first $\lambda/4$ plate 15 into linearly polarized light whose deflection direction is rotated by 90° from that of light entering thereinto. This linearly polarized light enters into the deflection beam splitter 2.

Since the light thus returned is linearly polarized light whose deflection direction is rotated by 90° from that of entering light, the deflection beam splitter 2 reflects the returning light as described above. The reflected light is converged onto the pin hole 11 through the converging lens 10, and is then detected by the optical detector 12, to be obtained as a confocal image.

Next, operation of the structure described above will be explained in more details with reference to FIGS. 1 and 2A and 2B.

At first, a laser beam of linearly polarized light is emitted from a laser light source 1 and passes through a deflection beam splitter 2. The laser beam is then subjected to two-dimensional scanning in the horizontal and vertical directions by galvanic mirrors 3a and 3b, and further enters into a first $\lambda/4$ plate 15 through a pupil projection lens 4. Then, as shown in FIG. 2A, the $\lambda/4$ plate 15 converts the linearly polarized light 25 into circularly polarized light 26 indicated by a continuous line in the figure. The laser beam thus adjusted to be circularly polarized light 26 enters into an image rotation mechanism 6.

In the image rotation mechanism 6, the circularly polarized light 26 from the first $\lambda/4$ plate 15 is converted into linearly polarized light 27 by a second λ/4 plate 16, and then enters into an image rotation prism 5. In the image rotation prism 5, from the linearly polarized light 27 consisting of only a p-direction component, linearly polarized light 28 consisting of only the p-direction component is emitted, regardless of a phase difference between the p-direction component and the s-direction component of the deflection caused by the total reflection surfaces. Further, the linearly polarized light 28 is converted again into circular polarized light 29 indicated by a continuous line in the figure, by a third λ/4 plate 17.

The circularly polarized light 29 is converged onto a sample 9 through an imaging lens 7 and an objective lens 8. Reflection light from the surface of the sample 9 enters again into the third λ/4 plate 17 of the image rotation mechanism 6 through the objective lens 8 and the imaging lens 7.

Figure 2A:
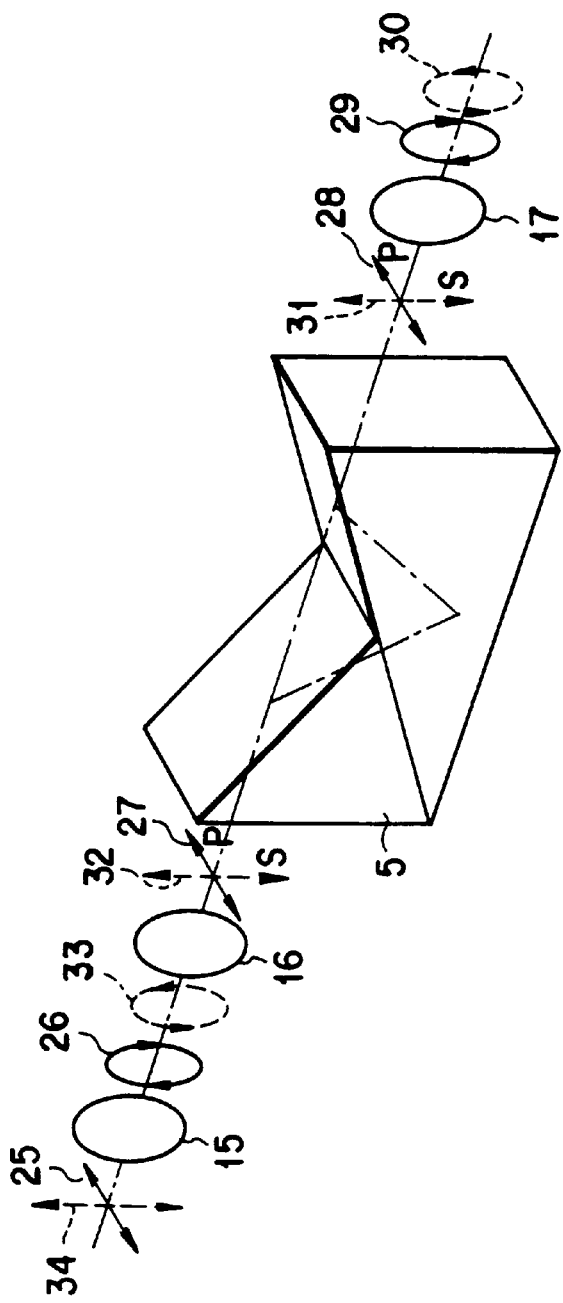
FIGS. 2A and 2B are views for explaining operation of the first embodiment.

Subsequently, as shown in FIG. 2A, the reflection light from the sample 9 is circularly polarized light 30 which is rotated in a direction inverse to that of the entering light for illuminating the sample 9, and therefore, the circularly polarized light 30 is converted into linearly polarized light 31 by the third λ/4 plate 17 and then enters into the image rotation prism 5. In the image rotation prism 5, from the linearly polarized light 31 consisting of only a s-direction component, linearly polarized light 32 consisting of only the s-direction component is emitted, regardless of a phase difference between the p-direction component and the s-direction component of the deflection caused by the total reflection surfaces. Further, the linearly polarized light 32 is converted into circular polarized light 33 indicated by a broken line in FIG. 2A, by a second λ/4 plate 16. Further, linearly polarized light 34 whose deflection direction is rotated by 90° from that of entering light is emitted by the first λ/4 plate 15, and then enters into the deflection beam splitter 2 through the pupil projection lens 4. The light is thereby reflected and is converged onto the pin hole 11 through the converging lens 10, so that a confocal image is formed by the optical detector 12.

Next, in case where a scanning direction of spot illumination is aligned with an arbitrary direction toward a sample 9 while the sample 9 is fixed, the central control section 23 drives a prism rotation motor 21 through a rotation motor driver 22. Rotation of the prism rotation motor 21 is transmitted to a prism hold member 18 through gears 20 and 19, and the prism hold member 18 is rotated by a predetermined angle θ. In this operation, the second λ/4 plate 16, the image rotation prism 5, and the third λ/4 plate 17 are integrally rotated coaxially without a phase difference.

In this case, if only the rotation prism 5 is rotated by an angle θ, the linearly polarized light 28 enters with being rotated by the angle θ with respect to the total reflection surfaces contained in the prism 5, and the ratio between the amplitudes of the p-component and the s-component of the deflection is changed, so that the polarization characteristic of light emitted therefrom also tends to change.

Figure 2B:
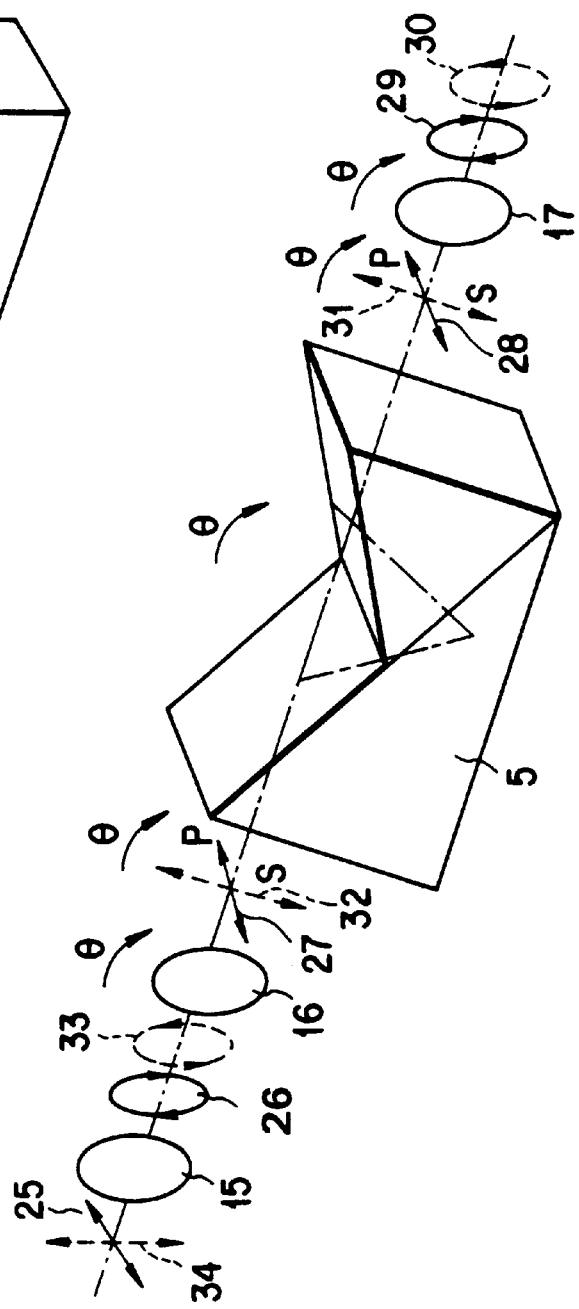

However, in the present embodiment, the second λ/4 plate 16 and the third λ/4 plate 17 are rotated by the angle θ together with the image rotation prism 5, as shown in FIG. 2B. Therefore, the linearly polarized light 27 rotated by the angle θ by the second λ/4 plate 16 continuously corresponds to the p-direction of the total reflection caused by the image rotation prism 5. Hence, the polarization characteristic of entering light with respect to the image rotation prism 5 relates only to the p-direction component, regardless of the rotation amount of the image rotation prism 5. In addition, the linearly polarized light 28 emitted from the rotation prism 5 is rotated by the angle θ like the rotation of the image rotation prism 5. However, since the third λ/4 plate 17 are rotated by the angle θ together, the linearly polarized light 28 is converted into the circularly polarized light 29 by the third λ/4 plate 17, so that the circularly polarized light 29 is continuously obtained regardless of the rotation of the image rotation prism 5. As a result of this, the light emitted from the image rotation mechanism 6 is not rotated with respect to the optical axis, unlike elliptic polarization, and light can be continuously emitted with a constant polarization characteristic.

Therefore, according to the structure as described above, the polarization characteristic with respect to the image rotation prism 5 is always constant. In addition, light entering into and exiting from the image rotation mechanism 6 is circularly polarized light.

This means that the polarization characteristic of entering light with respect to the image rotation prism 5 is maintained to be constant even when the image rotation prism 5 is rotated, and the polarization characteristic of light emitted from the image rotation mechanism 6 is always constant regardless of rotation of the image rotation prism 5.

Therefore, the polarization characteristic is not changed by rotation of the image rotation mechanism 6, so that changes in brightness is not caused even when an image is rotated, but a stable observation image can be continuously obtained.

In addition, the second λ/4 plate 16 and the third λ/4 plate 17 may simply be rotated in the same direction by the same amount as the image rotation prism 5, and these plates 16, 17 and prism 5 can be provided integrally on the prism hold member 18, so that the structure can be simplified.

In the above explanation, gears 19 and 20 are used as a means for transmitting the drive force from the prism rotation motor 21 to the prism hold member 18. However, it is possible to use a transmission means such as a timing belt or the like. In addition, the prism hold member 18 may be manually rotated without using the prism rotation motor 21.

Figure 3A:
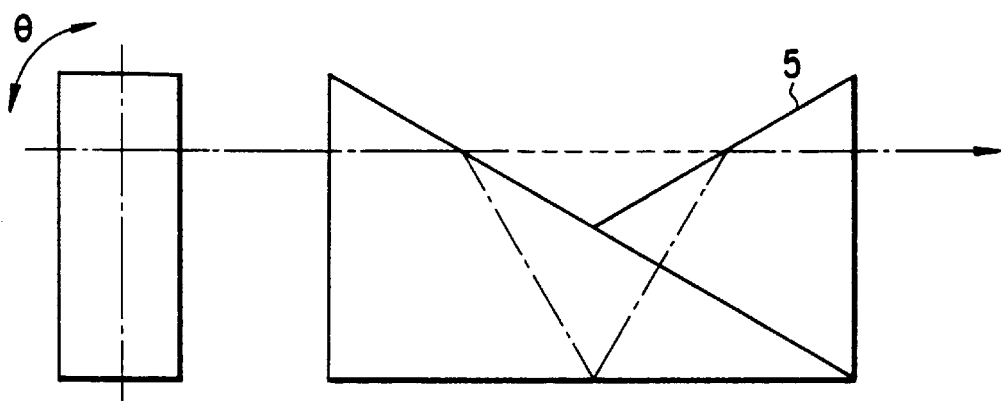
FIGS. 3A, 3B, and 3C are views respectively showing other structures of an image rotation prism.
Figure 3B:
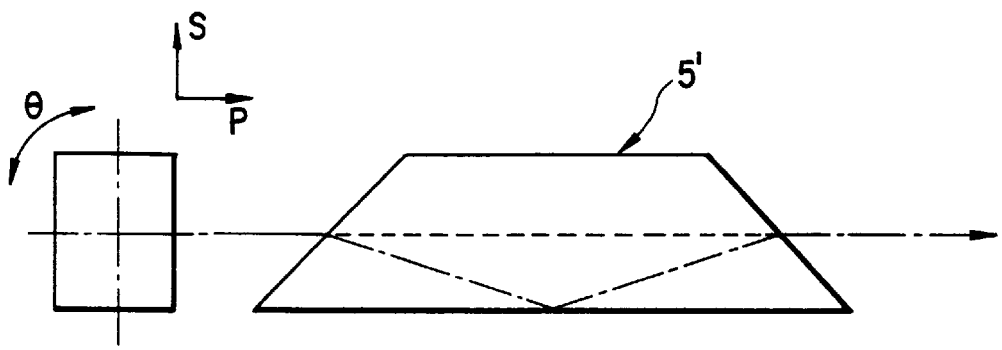
Figure 3C:
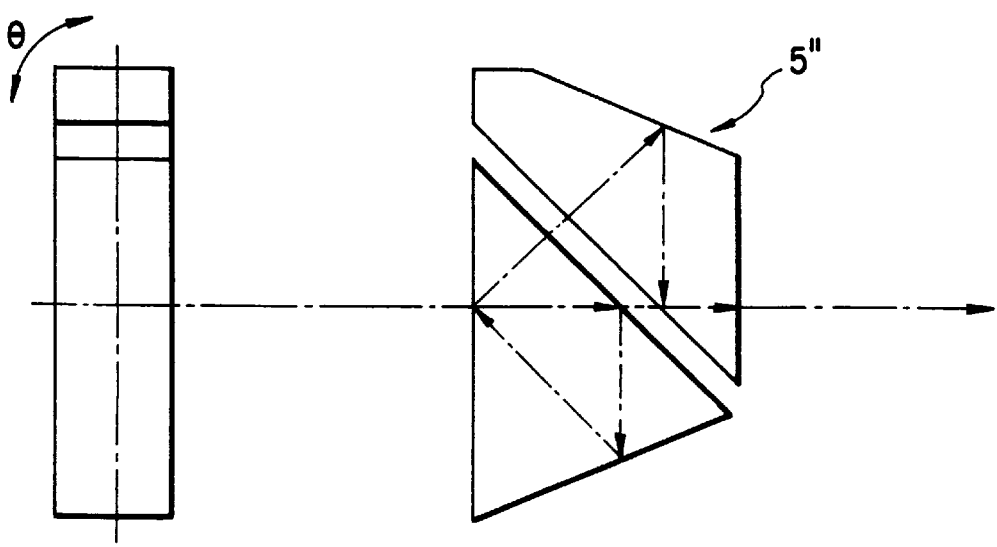

In the present embodiment, the image rotation prism 5 is a prism by which entering light is reflected for three times and is then emitted, as shown in FIG. 3A. However, the prism is not particularly limited hereto but may have a structure 5' (which reflects light once) as shown in FIG. 3B or a structure 5" (which reflects light for five times) as shown in FIG. 3C, as long as the structure reflects entering light for odd-numbered times.

Also in the present embodiment, rotation of an image is achieved by using a prism 5. However, rotation of an image may be achieved by using mirrors as long as the structure as described above can be satisfied.

Structure for Preventing Displacement of Scanning Range Caused When Magnifying and Rotating Image Next, explanation will be made of a second feature of the present invention, i.e., a "structure for preventing a displacement of a scanning range caused when magnifying and rotating an image".

In FIG. 1, a rotation amount of the image rotation prism 5 rotated by the image rotation mechanism 6 is fed back to the center control section 23.

Meanwhile, the galvanic mirrors 3a and 3b (or a deflector) are connected to the central control section 23 through a galvanic mirror driver 36. The central control section 23 simultaneously controls the deflection angles of the galvanic mirrors 3a and 3b, based on the rotation amount of the image rotation prism rotated by the image rotation mechanism 6, when image rotation is carried out by the image rotation prism 5.

Figure 4:
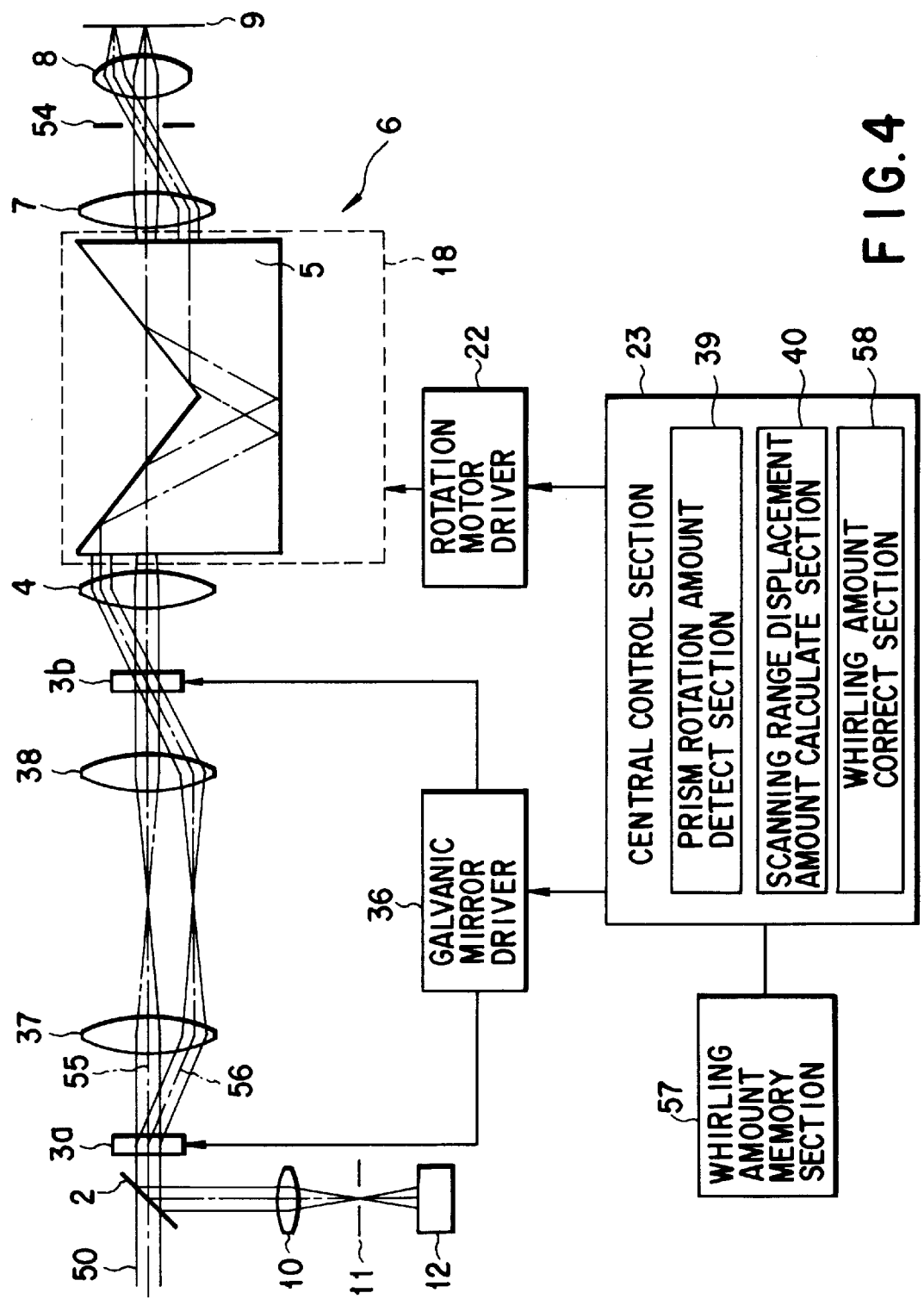
FIG. 4 is a schematic view for explaining operation of the first embodiment.

FIG. 4 is a schematic view showing only the section of the control system related to the second feature.

In the optical system shown in the figure, each of references 37 and 28 denotes a pupil transfer lens, although the lenses 37 and 38 are omitted from FIG. 1.

The central control section 23 is provided with a prism rotation amount detect section 39, and a scanning range displacement amount calculate section 40 for calculating a displacement of a scanning range, based on rotation of the prism 5.

Figure 5:
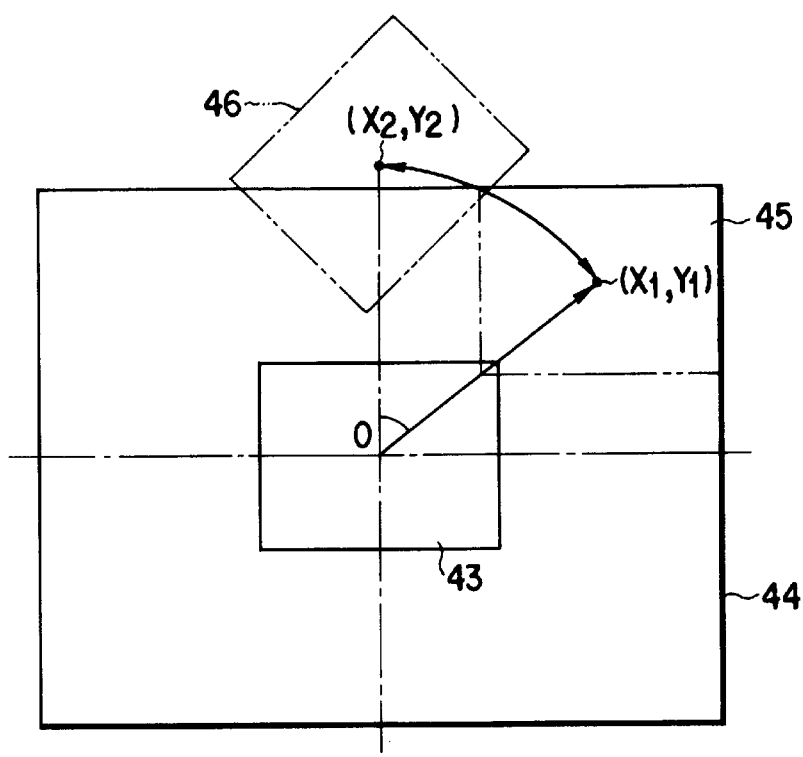
FIG. 5 is a view which explains positioning of a scanning range.

Specifically, as shown in FIG. 5, the view range is zoom-magnified to a range designated by a reference 45 from a view range 44 of a initial state, by controlling the scanning range of the galvanic mirrors 3a and 3b. The center of the view range, i.e., the center of the scanning range 45 of the galvanic mirrors 3a and 3b is expressed as (X1,Y1) in relation to the optical axis center O as the origin.

In this state, when the image rotation prism 5 is rotated by a predetermined angle θ/2, the scanning range 45 moves to a position designated at a reference 46 in FIG. 5. As a result, a problem occurs in that the scanning range 45 cannot be rotated around the center (X1,Y1), and besides, a quite different scanning range 46 is caught as the view range.

To solve the problem, it is necessary to estimate the amount by which the scanning range will be displaced in accordance with rotation of the image rotation prism 5, and to move the scanning range of the galvanic mirrors 3a and 3b by the displacement amount.

Specifically, coordinates (X2,Y2) relative to the optical axis center O of the displaced scanning range 46 is expressed as follows.

$$\begin{pmatrix} X2 \\ Y2 \end{pmatrix} = \begin{pmatrix} \cos\theta & -\sin\theta \\ \sin\theta & \cos\theta \end{pmatrix} \begin{pmatrix} X1 \\ Y1 \end{pmatrix} \quad (1)$$

Therefore, in order to achieve image rotation with respect to a desired scanning range 45 described above without moving the center of the image, the scanning range displacement amount calculate section 40 must calculate the following amount.

$$(X1-X2, Y1-Y2) = (X1(1-\cos\theta) + Y1\sin\theta, -X1\sin\theta + Y1(1-\cos\theta)) \quad (2)$$

The deflection angles of the galvanic mirrors 3a and 3b may be simultaneously controlled by the galvanic mirror driver 36, such that the scanning range is moved by the amount (X1-X2, Y1-Y2).

Next, operation based on the above-described structure will be explained below in more details, with reference to FIG. 4.

A light beam 50 from the laser light source 1 enters into a first galvanic mirror 3a through a beam splitter 2, and further enters into a second galvanic mirror 3b through pupil transfer lenses 37 and 38. The light beam 50 further enters into a pupil 54 of an objective lens 8 through a pupil projection lens 4, an image rotation prism 5, and an image lens 7. In this state, the galvanic mirrors 3a and 3b are subjected to two-dimensional scanning, so that spot light two-dimensionally scans a sample. Note that a light path designated at a reference 55 in the figure schematically shows a normal light path schematically shown, and a light path designated at a reference 56 schematically shows a light path during scanning.

The light beam reflected from the sample 9 inversely runs the same path which the light beam has run to enter into the sample 9, and then returns to the beam splitter 2. The light beam is picked up as a detected beam by a detector 12.

The scanning range 44 on the sample 9 is changed into the scanning range 43, as shown in FIG. 5, by firstly changing the deflection angles of the galvanic mirrors 3a and 3b so as to be smaller with a constant ratio kept between the angle. Thus, optical zoom-magnification can be achieved with an arbitrary magnification ratio. In order to carry out positioning of a view range of an image thus subjected to zoom-magnification, the deflection angles of the galvanic mirrors are offset by a predetermined amount. In this manner, the scanning range 43 can be moved to the scanning range 45.

In order to further rotate the image of the scanning range 45 from this state, the image rotation prism 5 is rotated by θ/2, and then, the scanning range 45 is moved to the scanning range 46. In this case, where the center of the scanning range 45 is expressed as (X1,Y1) relative to the optical axis center, the center (X2,Y2) of the scanning range 46 relative to the optical axis center is expressed as the equation (1). The prism rotation amount detect section 39 provided in the central control section 23 detects positional information as a rotation amount of the image rotation prism 5.

Subsequently, the scanning range displacement calculate section 40 calculates a displacement amount of the scanning range from the equation (2) on the basis of the rotation amount of the image rotation prism 5, and the deflection angles of the galvanic mirrors are simultaneously controlled such that the scanning range is moved by the displacement amount. As a result, an image can be rotated around the center of the image even when the scanning range 46 is not coaxially positioned with respect to the optical axis center.

Structure for Preventing Whirling Caused By Rotation of Image Rotation Prism

Next, explanation will be made( of a third feature of the present invention, i.e., a "structure for preventing whirling caused by rotation of an image rotation prism". Specifically, if components of an image rotation prism 5 or an image rotation mechanism 6 contains a processing error or an assembling error, the optical axis of entering light and the optical axis of exiting light are displaced from each other. If the image rotation prism is rotated in this state, exiting light may cause whirling. The third feature of the present invention has been considered to prevent such whirling.

At first, as shown in FIG. 4, the central control section 23 is connected with a whirling amount memory section 57. The whirling amount memory section 57 stores whirling amounts of a light beam in form of a table, which are caused due to a processing error of the image rotation prism 5 or the processing accuracy or assembling accuracy of the components of the image rotation mechanism 6.

Also, the central control section 23 is provided with a whirling amount correct section 58. The whirling amount correct section 58 estimates a whirling amount which will actually appear by applying a prism rotation amount detected by the prism rotation amount detect section 39, to the table stored in the whirling amount memory section 57. Further, the whirling amount correct section 58 calculates such a drive amount for the galvanic mirrors 3a and 3b, which will cancel the whirling amount estimated.

The central control section 23 electrically controls the deflection center angles of the galvanic mirrors 3a and 3b, based on the calculation result obtained by the whirling amount correct section 58, thereby to move the two-dimensional scanning range on the sample 9, so that the whirling amount of a light beam with respect to the image rotation prism 5 can be canceled.

By this control, the center of the two-dimensional scanning range on the sample 9 can be moved to return to an original position, and a two-dimensional scanning image obtained by the detector 12 can be obtained at the same position as that before rotation of the image rotation prism 5, without moving the center of the image.

Second Embodiment

Figure 6:
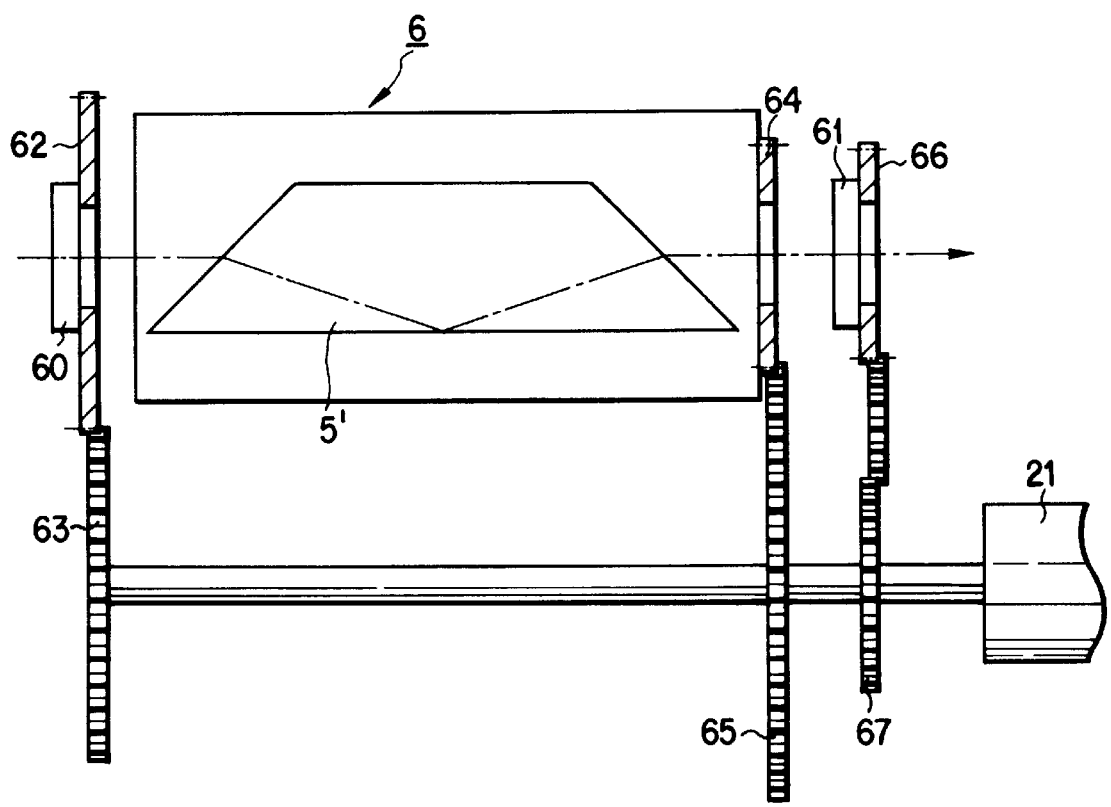
FIG. 6 is a view showing a schematic structure of a second embodiment of the present invention.

Next, a second embodiment of the present invention will be explained with reference to FIG. 6. The second embodiment relates to a modification of the first feature of the present invention, i.e., "a structure for maintaining a constant polarization characteristic of exiting light from an image rotation device". Note that explanation of the same portions as those of the first embodiment will be omitted herefrom.

In the second embodiment, a mechanism indicated as an image rotation prism 5' in FIG. 3B is adopted in place of the rotation mechanism 5. On one same optical axis extending in both sides of the image rotation prism 5', a first $\lambda/2$ plate 60 is provided in the light entering side of the prism and a second $\lambda/2$ plate 61 is provided in the light exiting side thereof. The first $\lambda/2$ plate 60 is connected to the prism rotation motor 21 through gears 62 and 63, and the second $\lambda/2$ plate 61 is connected to the motor 21 through gears 66 and 67.

The important point of the structure described above is that the gear ratios of the gears 62 and 63 and the gears 66 and 67 are arranged such that the first and second $\lambda/2$ plates 60 and 61 are respectively rotated by $\theta/2$ and $-\theta/2$ when the image rotation prism 5' is rotated by $\theta$.

Therefore, in this structure, when the prism rotation motor 21 is driven to rotate the image rotation prism 5' by $\theta$, the first $\lambda/2$ plate 60 is rotated by $\theta/2$ and the second $\lambda/2$ plate 61 is rotated by $-\theta/2$.

Then, the light emitted from the first $\lambda/2$ plate 60 is rotated by $\theta$ with respect to the optical axis. However, in this state, since the image rotation prism is rotated by $\theta$, the polarization characteristic of light entering into the image rotation prism 5' is constant regardless of the rotation amount of the image rotation prism 5'. More specifically, since the image rotation prism 5' is rotated by $\theta$, the light exiting therefrom is rotated by $\theta$, while the second $\lambda/2$ plate 61 is simultaneously rotated by $-\theta/2$, so that the light is further rotated by $-\theta$. Accordingly, the polarization characteristic is constant as a whole with respect to an optical system following the image rotation mechanism.

Therefore, according to the second embodiment, it is possible to eliminate changes of the polarization characteristic of emitted light caused due to rotation of the image rotation prism 5', like the first feature of the first embodiment.

Third Embodiment

The third embodiment relates to another structure which achieves the second feature of the first embodiment according to the present invention, i.e., another "structure for preventing a displacement of a scanning range caused when magnifying and rotating an image".

The first embodiment has been explained with respect to an example in which galvanic mirrors 3a and 3b are used as an optical deflector. However, the third embodiment adopts, as an optical deflector, a resonance galvanic scanner which is not capable of electrically changing the deflection center angle.

Figure 7:
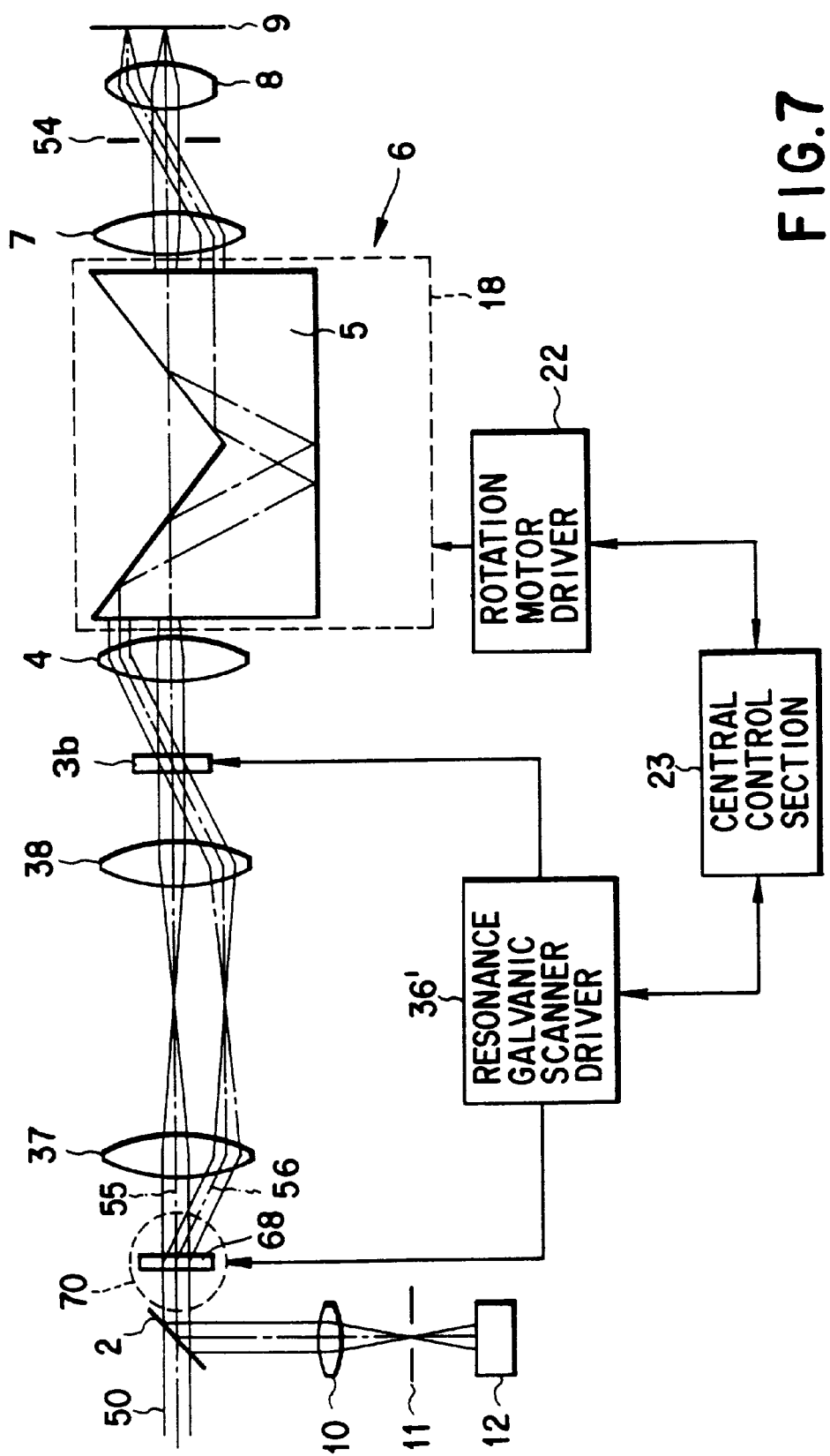
FIG. 7 is a view showing a schematic structure of a third embodiment.

FIG. 7 shows a schematic structure of the third embodiment, and those portions in this figure which are the same as those shown in FIGS. 1 and 4 are referred to by the same references. In FIG. 7, a reference 68 denotes a resonance galvanic scanner used as an optical deflector. The resonance galvanic scanner 68 is connected to a stepping motor not shown and a rotation mechanism 70 including a deceleration mechanism. The resonance galvanic scanner 68 itself is rotated by the rotation mechanism 70, driven by the resonance galvanic scanner drive 36', so that the deflection center angle can be changed.

Therefore, if the structure is thus arranged, even the deflection center angle can be changed by the rotation mechanism 70 even in case of a deflector such as a resonance galvanic scanner which is not capable of adjusting the deflection center angle, so that the same effects can be expected as obtained in the first embodiment.

Otherwise, the structure may be arranged so as to use a polygon mirror as an optical deflector. In this case, the scanning range can be maintained to be constant regardless of rotation of the image rotation prism, by controlling the timing at which an image is taken in.

With respect to galvanic mirrors 3a and 3b and a resonance galvanic scanner 68, as has been described above, the same effects can be obtained by controlling the timing at which an image is taken in.

Fourth Embodiment

The fourth embodiment relates to an example in which the third feature of the first embodiment is applied to another type of optical microscope than a confocal scanning type microscope. In the following, this embodiment will be explained with reference to FIG. 8.

Figure 8:
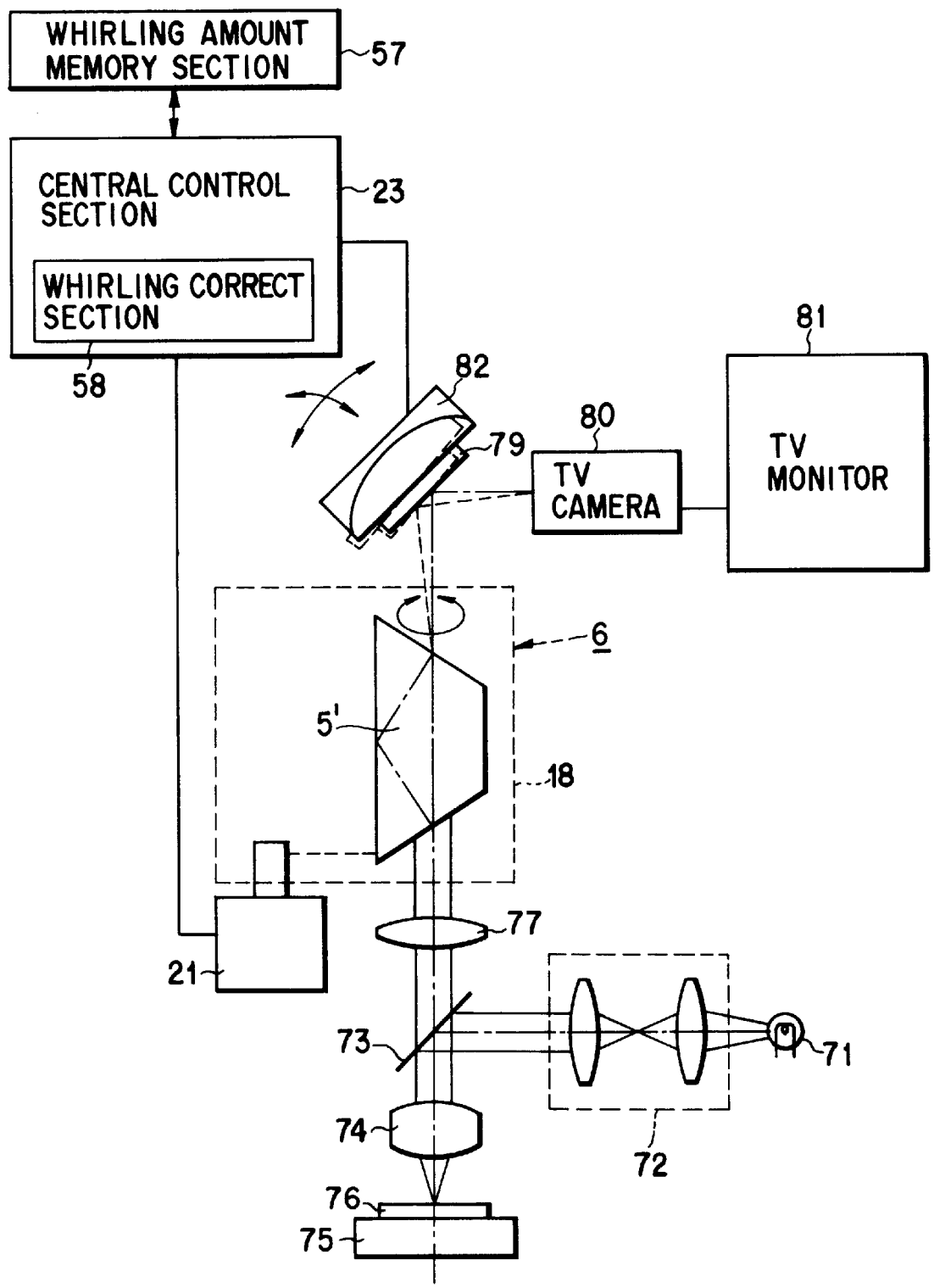
FIG. 8 is a view showing a schematic structure of a fourth embodiment.

In FIG. 8, a reference 71 denotes a light source. Illumination light emitted from the light source 71 passes through an illumination optical system 72 and is reflected by an half mirror 73, to be introduced into an objective lens 74.

The illumination light introduced into the objective lens is irradiated onto a sample 76 set on a sample stage 75, and reflection light from the sample is introduced again into the objective lens 74. The reflection light passes through the half mirror and is introduced into an image rotation device 6 through an imaging lens 77. The light further passes through a reflection mirror 79 and forms an image on an image pick-up surface of a TV camera 80. The reflection mirror 79 serves to reverse back an optical image once reflected and reversed by the image rotation device 6. Further, the optical image picked up by the TV camera 80 is converted into electric signals and is displayed on a TV monitor 81.

The structures of the image rotation device 6 and the central control section 23 used herein are the same as those of the first embodiment, and therefore, detailed explanation thereof will be( omitted herefrom.

Meanwhile, the reflection mirror 79 is installed on a biaxial oblique stage 82. The biaxial oblique stage 82 supports the reflection mirror 79 to be rotatable in two axial directions of X- and Y-axes, and inclines the reflection mirror 79 by predetermined angles in the X-axis direction and the Y-axis direction, in accordance with an instruction from the central control section 23 (or a whirling amount correct section 58), so that the whirling amount of reflection light can be controlled.

In the structure described above, it is possible to effectively prevent whirling of exiting light, caused due to a processing error of an image rotation prism 5' or the like. Specifically, the reflection angle of the reflection mirror 79 is changed so as to cancel the whirling, so that a rotated image can be displayed on the TV monitor 81 with the center of the image unmoved even when the image rotation prism 5' is rotated.

In the present embodiment, exiting light from the image rotation prism 5' is deflected by the reflection mirror 79. Inversely, however, a light beam may be previously deflected by a reflection member and is then introduced into the image rotation prism 5', such that whirling of the exiting light from the image rotation prism 5' is canceled.

With respect to the structure according to the third feature, the first embodiment: and the present embodiment respectively adopt galvanic mirrors 3a and 3b and a reflection mirror 79 as optical deflectors. However, it is possible to adopt other types of optical deflectors, such as a parallel flat plate and the like.

Note that the present invention is not limited to the first to fourth embodiments described above, but can be modified into various forms while maintaining their own features.

For example, it is possible to adopt only the structures according to the second and third feature, without adopting the structure according to the first feature. This may be a case that a change of the polarization characteristic can be allowed even if the first and second polarization characteristic conversion optical systems are removed.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical microscope apparatus comprising:
    an illumination optical system for illuminating an observation target object;
    an observation optical system for introducing an observation image of the observation target object; and
    an image rotation device provided on a light path common to the illumination optical system and the observation optical system, for rotating the observation image, wherein the image rotation device is arranged so as to reflect a light beam entering thereinto, for odd-numbered times and to thereafter emit the light beam therefrom, and is driven to be rotated around an entering/exiting optical axis, thereby to rotate the observation image,
    a scanning optical system provided in the illumination optical system for deflecting observation light to be irradiated on the observation target object, within a predetermined angle range, so as to enter into the image rotation device, so that the sample is scanned with the observation light, and
    a control device for controlling a deflection angle of the scanning optical system, based on a rotation amount of the image rotation device, such that a scanning range of the observation light is adjusted to be within a predetermined range, with respect to the observation target object, regardless of the rotation operation of the image rotation device.

2. An optical microscope apparatus according to claim 1, further comprising:
    a memory device for previously storing a whirling amount of exiting light from the image rotation device, in relation to a rotation amount of the image rotation device; and
    an optical deflector for deflecting at least one of entering light and the exiting light of the image rotation device, by a deflection amount which can be changed; and
    wherein the control device controls the deflection to be performed by the deflector, based on the whirling amount stored in the memory device, in correspondence with a rotation amount of the image rotation device such that the whirling amount of the exiting light from the image rotation device is canceled.

3. An optical microscope apparatus according to claim 2, wherein:
    the optical deflector includes a biaxial oblique stage; and a reflection mirror held by the biaxial oblique stage, and
    the control device controls a reflection angle of the reflection mirror by operating the biaxial oblique stage, based on the whirling amount stored in the memory device, in correspondence with the rotation amount of the image rotation device, such that the whirling amount of the exiting light from the image rotation device is canceled.

4. An optical microscope apparatus according to claim 1, further comprising:
    a memory device for previously storing a whirling amount of exiting light from the image rotation device, in relation to a rotation amount of the image rotation device; and
    an optical deflector for deflecting at least one of entering light and the exiting light of the image rotation device, by a deflection amount which can be changed; and
    wherein the control device controls a timing of sampling of an observation image, based on the whirling amount stored in the memory device, in correspondence with a rotation amount of the image rotation device, such that the whirling amount of the exiting light from the image rotation device is canceled.

5. An optical microscope apparatus according to claim 1, wherein the deflection angle of the scanning optical system is controlled such that the scanning range is moved by an amount of $(X1-X2, Y1-Y2)$ which satisfies an equation of $(X1-X2, Y1-Y2)=(X1(1-\cos \theta)+Y1 \sin \theta, -X1 \sin \theta+Y1 (1-\cos \theta))$, where $(X1,Y1)$ is a center of the scanning range of the scanning optical system with respect to a rotation center of the image rotation device before rotation, and $(X2,Y2)$ is a center of the scanning range with respect to the rotation center when the image rotation device is rotated by $\theta/2$.

6. An optical microscope apparatus according to claim 1, wherein the image rotation device comprises an image rotation optical component arranged so as to reflect the entering light beam to rotate the observation image.

7. An optical microscope apparatus according to claim 6, wherein the image rotation device further comprises:
    a first polarization characteristic conversion optical system provided in a light entering side of the image rotation optical component, for converting light entering into the image rotation optical component, to have a constant polarization characteristic, regardless of rotation of the image rotation optical component; and
    a second polarization characteristic conversion optical system provided in a light emitting side of the image rotation optical component, for converting light emitted from the image rotation optical component, to have a constant polarization characteristic, regardless of rotation of the image rotation optical component.

8. An optical microscope apparatus according to claim 7, wherein at least one of the first and second polarization characteristic conversion optical systems includes $\lambda/4$ plates which are respectively provided in the light (entering side and in the light exiting side of the image rotation optical component and which are rotated integrally with the image rotation optical system, by an equal amount.

* * * * *